W. R. DENMAN.
TENSIONING DEVICE.
APPLICATION FILED OCT. 6, 1915.
1,187,978.
Patented June 20, 1916.
5 SHEETS—SHEET 3.
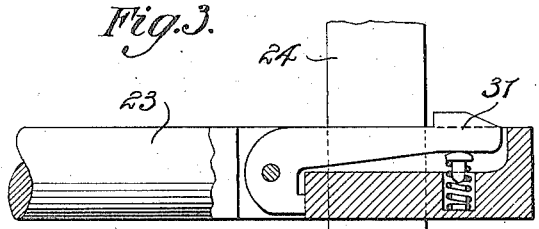
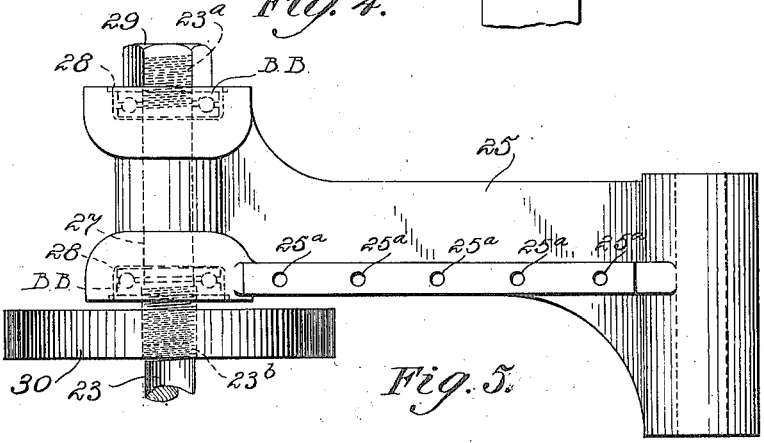
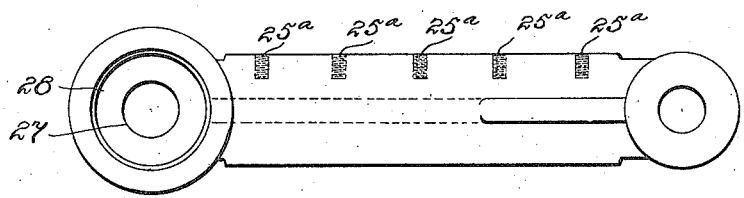
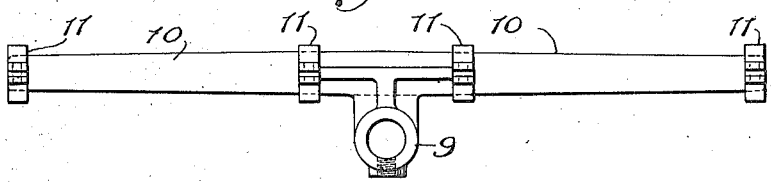
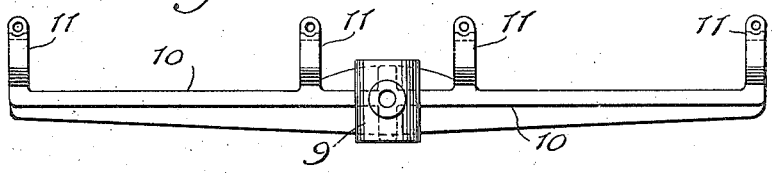
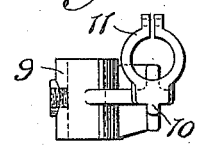
Inventor:
Walter R. Denman.
by Charles E. Parsons
Atty.

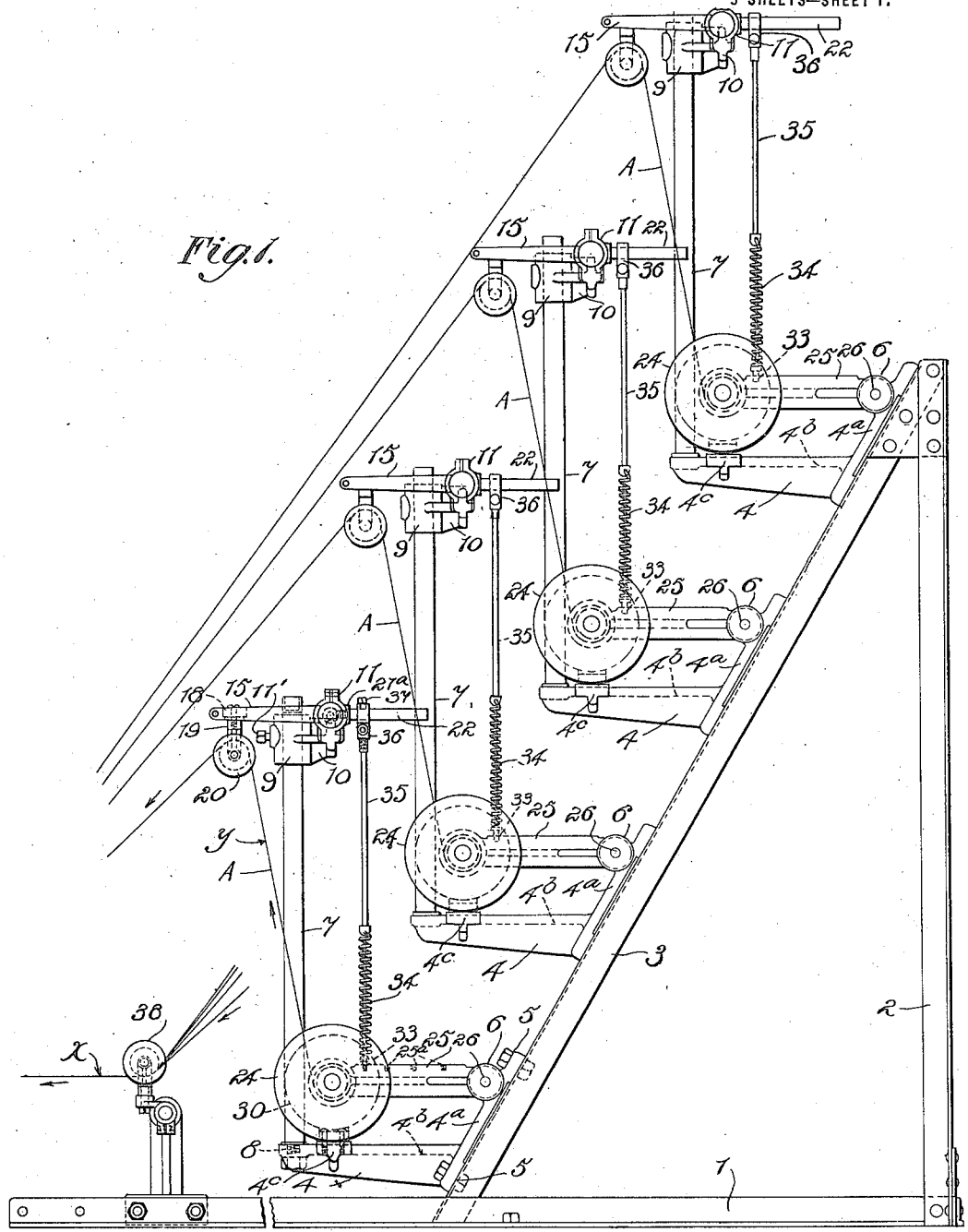

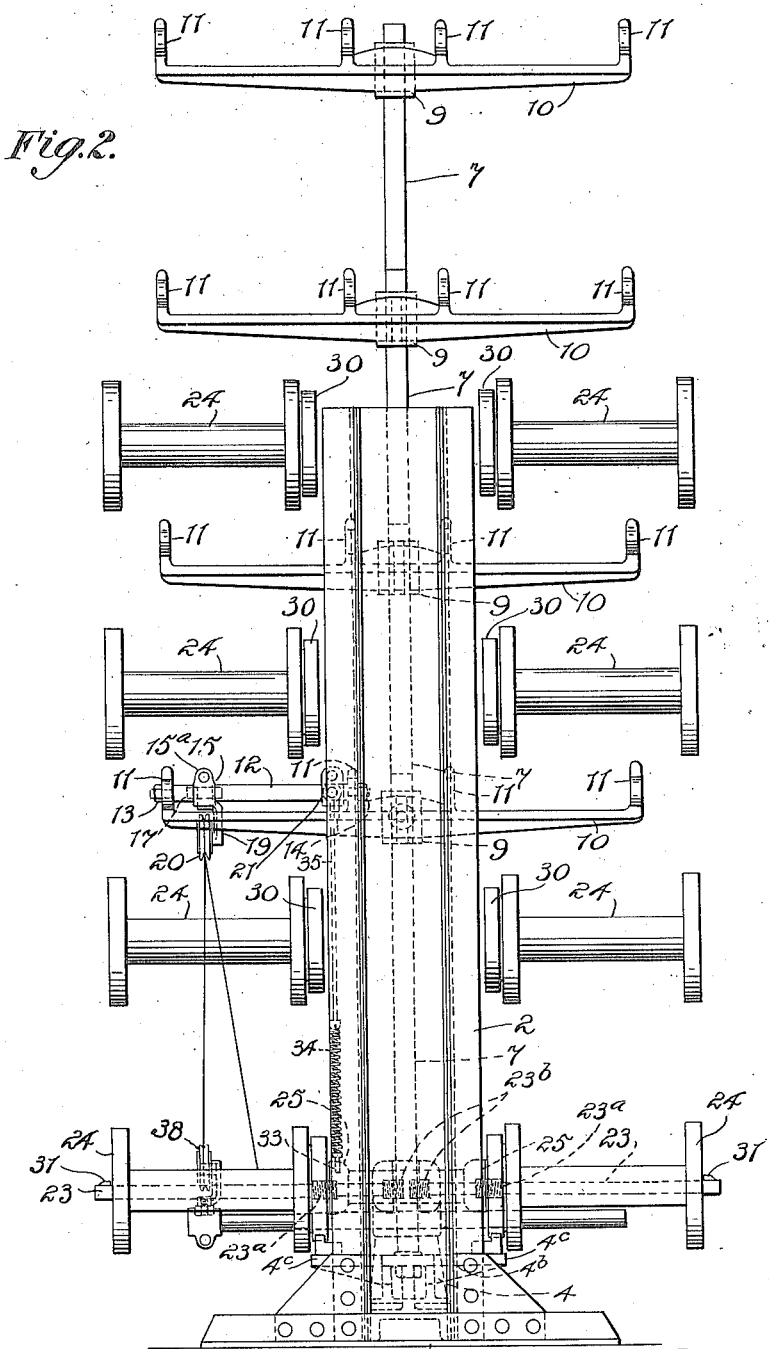

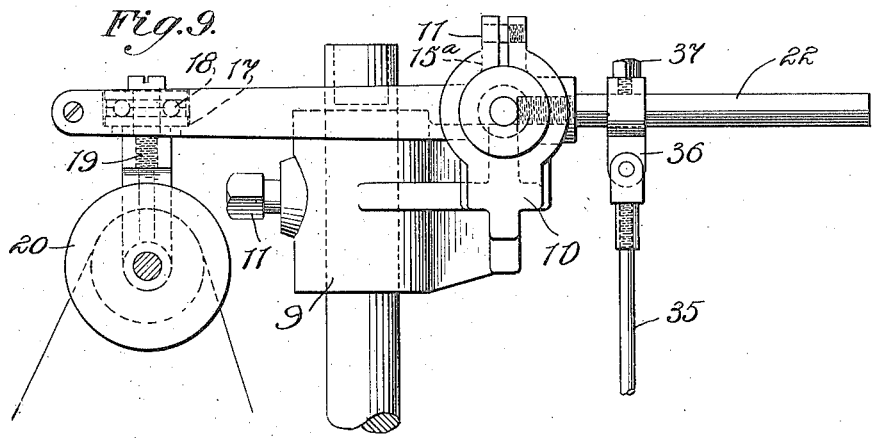
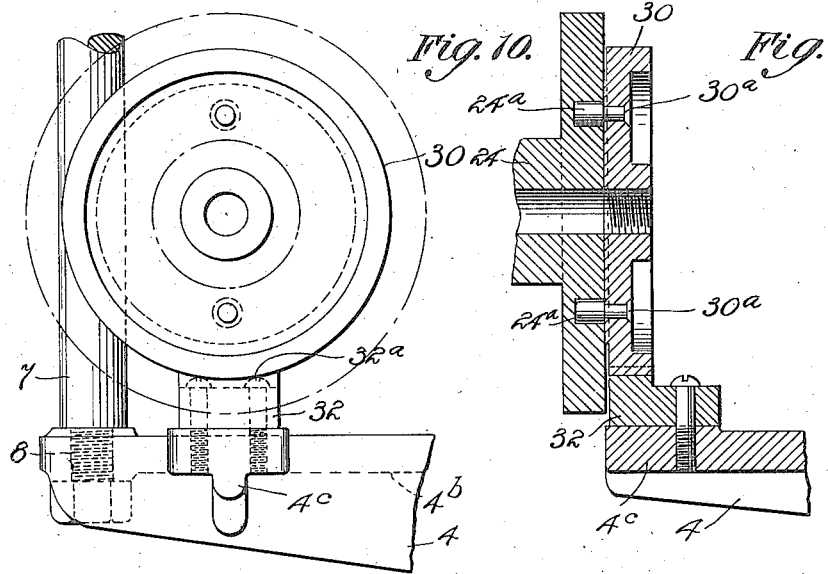
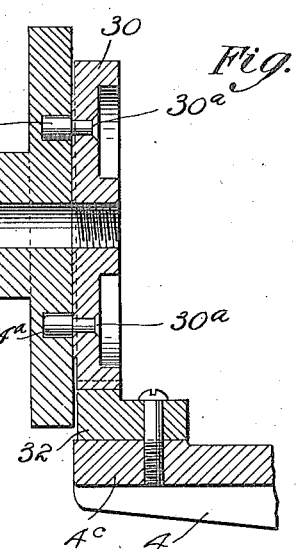
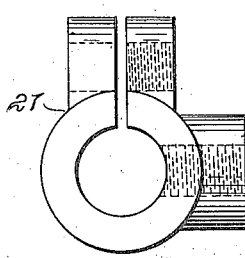
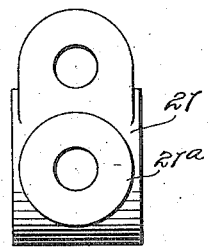

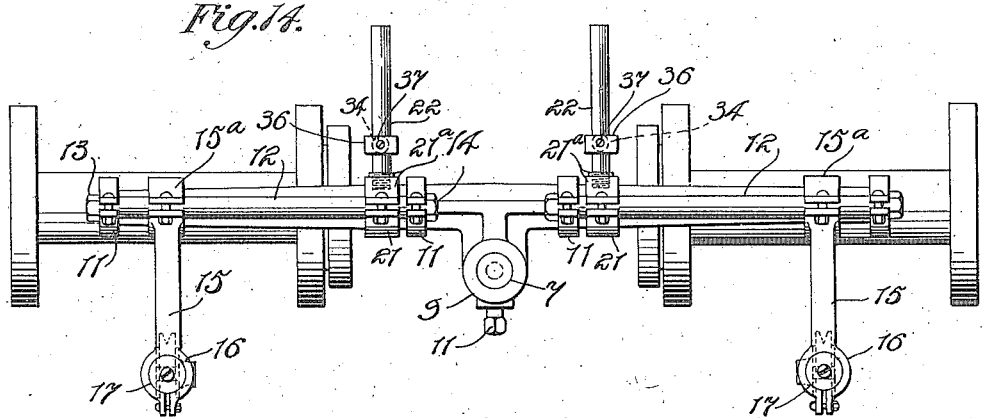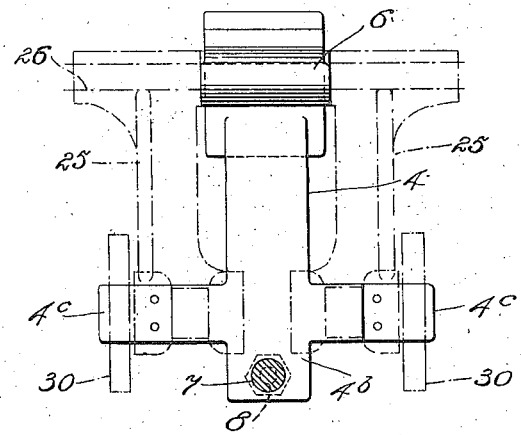

UNITED STATES PATENT OFFICE.

WALTER R. DENMAN, OF AKRON, OHIO, ASSIGNOR TO MILLER RUBBER CO., OF AKRON, OHIO, A CORPORATION OF OHIO.

TENSIONING DEVICE.

1,187,978.  Specification of Letters Patent.  Patented June 20, 1916.

Application filed October 6, 1915.  Serial No. 54,378.

*To all whom it may concern:*

Be it known that I, WALTER R. DENMAN, a citizen of the United States, residing at Akron, in the county of Summit and State of Ohio, have invented certain new and useful Improvements in Tensioning Devices, of which the following is a specification.

The present invention relates to tensioning devices and pertains more particularly to those forms of tensioning devices which are adapted to be used in feeding a plurality of cords or strands of thread to a twisting machine.

The present invention has for its object to provide a form of tensioning device of the kind above referred to which will be simple in construction and at the same time extremely sensitive in its operation.

Further objects of the invention consists in providing certain improvements and refinements in apparatus of the particular kind which will enlarge its use and increase its efficiency.

With these and other objects in view, the invention consists in the combination and arrangement of parts more fully described in the following specification, illustrated in the accompanying drawings, and pointed out in the appended claims.

In the drawings: Figure 1 is a side elevation of one embodiment of the present invention. Fig. 2 is a rear elevation of same. Fig. 3 is a detail of one of the spool retaining devices. Fig. 4 is a plan view, and Fig. 5 is a side elevation of one of the pivoted bracket arms. Fig. 6 is a plan view. Fig. 7 is a front elevation, and Fig. 8 is an end view of one of the vertically adjustable brackets. Fig. 9 is a fragmentary detail of one of the upper guide pulleys with its supporting structure. Fig. 10 is an elevational view of one of the friction driving disks with the spool removed. Fig. 11 is a sectional view of one of the driving disks with its spool attached. Figs. 12 and 13 are details. Fig. 14 is a plan view of one of the upper brackets. Fig. 15 is a detail.

Referring now to the drawings, the apparatus comprises a frame having a horizontally disposed base 1, a vertical upright 2 rigidly secured thereto and an inclined channel plate 3 extending from the top of the upright 2 to the base 1. The triangular frame thus formed serves to support the spools and various tension devices which are carried on brackets suitably arranged along the inclined plate 3.

The apparatus may be provided with any number of spools from which thread is fed to the twisting machine. In the present form however, a device is shown adapted to carry eight spools, arranged for convenience with four on either side of the central frame plate 3. The supporting mechanism, tension devices and thread guiding means are duplicated for each spool or pair of spools, hence the construction and arrangement of only one pair will be described in detail.

A plurality of fixed bracket plates 4 are secured at intervals to the outer face of the channel plate 3. Each of these brackets 4 comprises a portion $4^a$ secured by bolts 5 to the channel plate 3 and provided near its upper end with a bearing 6. At the lower end of the plate $4^a$ an integral plate $4^b$ is formed, extending horizontally to form a rigid support for other parts of the mechanism as will be hereinafter described. The horizontal extension $4^b$ is in the shape of a cross having a pair of arms $4^c$ extending therefrom on either side. A vertical rod 7 is supported at the outer central extremity of the cross-shaped bracket piece $4^b$, having its lower end threaded and bolted into a suitable opening 8, provided therefor. A horizontally disposed supporting frame 10 having a central integral sleeve or collar 9 is vertically adjustable by means of a set screw 11′ along the rod 7. By referring particularly to Figs. 6, 7 8 and 14 it will be seen that the main portion of the frame 10 is located at the rear side of the bushing 9 and extends parallel to the side arms $4^c$ of the cross-shaped bracket piece $4^b$ above which it is positioned. The frame 10 is provided with two pairs of upwardly extending split rings 11, each pair of which forms end bearings for one of the rods 12 adapted to be clamped therein by means of nuts 13.

Forwardly extending arms 15 are provided, one on each of the rods 12. The arms 15 are clamped onto the rods 12 near their outer ends, by means of split ring members $15^a$. At their forward ends, the arms 15 are formed with circular portions 16 recessed to form seats 17 for ball bearings 18 for the upper stems of depending forked members 19 having guide pulleys 20.

A pair of split collar fittings 21 are also provided, one for each of the rods 12. They are secured in suitable position near the inner ends of the rods 12 in a manner similar to the split collars 15ª of the arms 15. Each of the fittings 21 is formed with a laterally extending socket 21ª having an interior screw threaded bore adapted to receive the inner ends of rearwardly projecting rods 22. By means of the split collar connections with the rods 12, both the arms 15 and the fittings 21 can be adjusted to any desired position along the rods 12, and turned about rods 12.

The spindles 23 upon which the thread spools or bobbins 24 are carried are supported in the ends of arms 25, the opposite ends of which are pivotally mounted on pins 26 passing through the bearings 6 at the upper ends of the brackets 4. The outer free ends of the swinging arms 25 are each provided with transverse bores 27 having enlarged recesses 28 at either side to form seats for ball bearings B, B. The spindles 23 are loosely journaled in the bores 27 and are provided with two sets of screw threads 23ª and 23ᵇ, respectively. The outer screw threads 23ª have caps or lock nuts 29 threaded thereon, while the inner threads 23ᵇ engage with interiorly threaded bores of friction disks 30 carried on the spindles 23 just inside the inner ends of the spools 24. These friction disks 30 are each provided with pins which mesh with circular holes in spools 24, as is clearly shown in Fig. 10. The spools 24 are placed on the spindles 23 and retained in place by means of pivoted spring pressed catches 31, located at the outer spindle ends.

It will thus be seen that the spindles 23 are freely mounted with ball bearings to facilitate their rotation, while the spools 24 carried thereon have circular bolts to engage pins 24ª, which in turn are threaded onto the spindles 23 at 23ª.

Each of the arms 4ᶜ of the cross-shaped bracket ends 4ʰ has permanently fastened to its upper surface a fiber block 32 formed with a curved recess 32ª in its upper side conforming in contour to the curvature of the outer circumference of the disk 30. Under normal conditions the lower edge of the disk 30 rests on the block 32.

The upper edge of each of the swinging arms 25 is provided with a series of small circular, screw-threaded holes 25ª adapted to receive a small threaded pin 33 carried on the lower end of a coiled spring 34, which is attached to a depending rod 35, the upper end of which is carried in a sliding clip 36 adapted to be adjusted at different positions along the rod 22 by means of a set screw 37.

Each bracket 4 supports at its outer lower end one vertical rod 7 with its several adjustable devices carried thereon. Each bracket 4 has two swinging arms 25 hinged to its upper end, and each swinging arm 25 carries one thread spool or spindle 24.

As previously stated a machine may be equipped with any number of thread spindles and corresponding thread guiding and tensioning devices by merely duplicating the scheme and arrangement here shown and described in connection with eight spools.

From the spools 24 the threads A pass upwardly over the guide pulleys 20, thence to guide pulleys 38 and on to the twisting machine where the thread is to be twisted.

To illustrate clearly the various functions of the different parts let it be assumed that any particular thread A is given a sudden jerk or pull at X. This will exert an upward pull on the cord between the spool 24 and guide pulley 20 which lifts the friction disk 30 off of the block 32 on which it previously rested, due to the upward swinging of the arm 25 about its pivot. The spool will then be absolutely free to rotate and the tension will be thus relieved. Assuming a more gentle jerk is given the cord at X the spool 24 and disk 30 are not lifted from the block 32, but a tension is exerted on the arm 15 and through the rod 22 a slight tension is placed on the vertical rod 35, which acts through the coiled spring 34 to the pivoted arm 25 carrying the spool 24 and disk 30. The friction between the disk 30 and block 32 is consequently reduced and the extra tension caused by the gentle jerk is relieved. The pull upward at the point Y caused by the sudden jerk on the thread A as previously stated would tend to lift the disk 30 from the block 32, at the same time, however a downward pull would be exerted on the forward end of the arm 15, which acting through the rearwardly extending rod 22 and depending rod 35 and spring 34 would also tend to lift the disk 30. Thus a double action is exerted to relieve the friction between the disk 30 and block 32, making the apparatus very effective and sensitive as a tensioning device.

Adjustments can be easily made in all the various parts. Bracket 9 can be raised and lowered along the vertical rod 7; the sliding clip 36 can be moved along the rod 22 to vary the combined leverage of the arms 15 and rods 22. Pin 33 can also be shifted along the various holes 25ª in the upper edge of the swinging arms to change the lifting power of the coiled spring 34.

Having thus described my invention what I claim is:

1. A tensioning device comprising a thread carrying spool, an upwardly movable support therefor, friction means coacting with said spool under the action of gravity, a guide pulley supported in movable bearings and over which the thread passes, the pull upon the thread tending both to have a lifting effect on the spool support and a lowering effect on the guide pulley, and connections whereby the lowering of the guide pulley tends to exert an additional lifting effect on the spool support.

2. A tensioning device comprising a thread carrying spool, an upwardly movable support therefor, friction means coacting with said spool under the action of gravity, a guide pulley supported in movable bearings and over which the thread passes, the pull upon the thread tending both to have a lifting effect on the spool support and a lowering effect on the guide pulley, and resilient connections whereby the lowering of the guide pulley tends to exert an additional lifting effect on the spool support.

3. A tensioning device comprising a swinging arm, a thread spool loosely carried thereon, a friction member against which said thread spool normally contacts, a thread guide and means connecting said thread guide with said swinging arm for raising the latter off of the friction member to relieve the tension on the thread spool.

4. A tensioning device comprising a thread spool, a pivoted supporting arm therefor, a friction member normally in contact with said spool, a thread guide, means for adjusting the distance between said thread guide and said thread spool and resilient connections between said thread guide and said pivoted supporting arm.

5. A tensioning device comprising a supporting arm pivoted at one end, a thread spool rotatably carried at the other end, a friction member upon which said spool normally rests, a thread guide remote from said spool, a resilient connection between said thread guide and said pivoted arm and means for varying the degree of resiliency of said connection.

6. A tensioning device comprising a movable arm pivoted at one end, a spindle rotatably journaled in the other end, a thread spool carried on said spindle, a disk member non-rotatably carried on said spindle, coupling means between said disk and spool, a friction member against which said disk member normally contacts, and resilient means controlled by the thread for moving said pivoted arm to relieve the friction between said disk and said friction member.

7. A tensioning device comprising a fixed frame, a movable arm pivoted thereto at one end, a rotatable spindle journaled in the opposite end of said arm, a disk member non-rotatably carried on said spindle, means coupling said disk member and said spool, a friction block supported from said frame upon which said disk member normally rests, a vertical rod supported from said frame, an adjustable sliding bracket carried on said rod, a thread guide supported from said bracket, and a resilient coupling between said thread guide and said pivoted arm.

8. A tensioning device comprising a movable arm pivotally connected at one end and normally disposed in a horizontal position, a thread spool rotatably carried at the outer end of said arm, friction means normally supporting said thread spool, a vertically adjustable bracket carried above said thread spool, a pair of oppositely disposed lever arms extending from said bracket, a thread guide carried by one of said lever arms and an adjustable resilient coupling between the other lever arm and said movable pivoted arm.

In testimony whereof I affix my signature in presence of two witnesses.

WALTER R. DENMAN.

Witnesses:
C. A. WOLF,
R. D. BELDEN.